(12) United States Patent
Suzuki et al.

(10) Patent No.: US 7,957,604 B2
(45) Date of Patent: Jun. 7, 2011

(54) MOVING IMAGE CODING APPARATUS, MOVING IMAGE DECODING APPARATUS, CONTROL METHOD THEREFOR, AND COMPUTER-READABLE STORAGE MEDIUM

(75) Inventors: Masaki Suzuki, Saitama-ken (JP); Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 519 days.

(21) Appl. No.: 10/585,857

(22) PCT Filed: Mar. 11, 2005

(86) PCT No.: PCT/JP2005/004850
§ 371 (c)(1),
(2), (4) Date: Jul. 12, 2006

(87) PCT Pub. No.: WO2005/088976
PCT Pub. Date: Sep. 22, 2005

(65) Prior Publication Data
US 2008/0219571 A1   Sep. 11, 2008

(30) Foreign Application Priority Data

Mar. 12, 2004  (JP) ................................. 2004-071399
Jan. 24, 2005  (JP) ................................. 2005-015847

(51) Int. Cl.
*G06K 9/36* (2006.01)
*G06K 9/46* (2006.01)
*H04B 1/66* (2006.01)
*H04N 11/02* (2006.01)
*H04N 11/04* (2006.01)
*H04N 7/12* (2006.01)

(52) U.S. Cl. ... 382/236; 382/232; 382/239; 375/240.12; 375/240.13; 375/240.19

(58) Field of Classification Search .................. 382/236, 382/239, 232; 375/240.01–29
See application file for complete search history.

(56) References Cited

U.S. PATENT DOCUMENTS 4,974,071 A   11/1990   Maeda ............................. 358/80
(Continued)

FOREIGN PATENT DOCUMENTS

EP   763944 A2   3/1997
(Continued)

OTHER PUBLICATIONS

"Latest MPEG Textbook", ASCII Publishing, pp. 74-76, 1994.

*Primary Examiner* — Samir A Ahmed
*Assistant Examiner* — Li Liu
(74) *Attorney, Agent, or Firm* — Fitzpatrick, Cella, Harper & Scinto

(57) ABSTRACT

In this invention, even if final code data is to be generated by selectively discarding code data for each bitplane, errors due to bitplane rounding down operation can be suppressed from being gradually accumulated in predicted data such as P- and B-pictures, thereby preventing a deterioration in image quality. For this purpose, a block segmentation unit (31) segments an input frame into a plurality of blocks, and supplies the respective blocks to a difference computing unit (32). The difference computing unit (32) outputs the blocks to a DWT unit (33) without any change when the intra-frame coding mode is set. When the inter-frame coding mode is set, the difference computing unit (32) outputs the result obtained by computing a difference from predicted data from a motion compensation unit (42) to the DWT unit (33). The frequency component data obtained by the DWT unit (33) and a quantization unit (34) is entropy-coded by an entropy coding unit (35), and a bitplane formed by bit information at the bit position of each component value is coded. A bitplane round-down unit (36) rounds down the code data of bitplanes from the least significant position to an upper bit position such that the resultant code amount becomes equal to or less than a target code amount. A code forming unit then generates code data. Only when the intra-frame coding mode is set, a dequantization unit (39) and inverse DWT unit (40) are executed to update a frame memory (41).

5 Claims, 13 Drawing Sheets

U.S. PATENT DOCUMENTS

| | | | |
|---|---|---|---|
| 5,359,438 A | 10/1994 | Maeda | 358/539 |
| 5,371,606 A | 12/1994 | Katayama et al. | 358/400 |
| 5,450,209 A | 9/1995 | Niimura et al. | 358/335 |
| 5,521,717 A | 5/1996 | Maeda | 358/426 |
| 5,933,249 A | 8/1999 | Shimura et al. | 382/429 |
| 5,982,435 A | 11/1999 | Tong et al. | 348/398 |
| 6,067,382 A | 5/2000 | Maeda | 382/239 |
| 6,169,821 B1 | 1/2001 | Fukunaga et al. | 382/239 |
| 6,205,252 B1 | 3/2001 | Nguyen et al. | 382/234 |
| 6,272,180 B1 * | 8/2001 | Lei | 375/240.16 |
| 6,282,240 B1 * | 8/2001 | Fukunaga et al. | 375/240.01 |
| 6,307,886 B1 | 10/2001 | Westermann | 375/240.09 |
| 6,351,491 B1 | 2/2002 | Lee et al. | 375/240.03 |
| 6,396,955 B1 | 5/2002 | Abe | 382/232 |
| 6,480,547 B1 * | 11/2002 | Chen et al. | 375/240.27 |
| 6,486,981 B1 | 11/2002 | Shimura et al. | 358/500 |
| 6,512,793 B1 | 1/2003 | Maeda | 375/240.08 |
| 6,643,382 B1 | 11/2003 | Maeda | 382/100 |
| 6,697,521 B2 * | 2/2004 | Islam et al. | 382/166 |
| 6,763,071 B1 | 7/2004 | Maeda et al. | 375/240.25 |
| 6,798,977 B2 | 9/2004 | Maeda | 386/111 |
| 6,968,088 B2 | 11/2005 | Maeda et al. | 382/239 |
| 7,072,404 B2 | 7/2006 | Itokawa | 375/240.28 |
| 7,162,101 B2 | 1/2007 | Itokawa et al. | 382/282 |
| 2002/0031182 A1 | 3/2002 | Kishi | 375/240.19 |
| 2002/0037048 A1 * | 3/2002 | Van Der Schaar et al. | 375/240.12 |
| 2002/0154823 A1 | 10/2002 | Okada | 382/233 |
| 2004/0005095 A1 * | 1/2004 | Wu et al. | 382/238 |
| 2005/0013365 A1 * | 1/2005 | Mukerjee et al. | 375/240.16 |
| 2006/0013304 A1 | 1/2006 | Maeda et al. | 375/240.11 |
| 2007/0098073 A1 | 5/2007 | Maeda | 375/240.16 |
| 2007/0110158 A1 | 5/2007 | Maeda | 375/240.16 |
| 2007/0160299 A1 | 7/2007 | Kajiwara et al. | 382/240 |

FOREIGN PATENT DOCUMENTS

| | | |
|---|---|---|
| EP | 763944 A3 | 3/1999 |
| EP | 1 233 625 A2 | 8/2002 |
| GB | 2318244 A | 4/1998 |
| JP | 02-309777 | 12/1990 |
| JP | 03-006187 | 1/1991 |
| JP | 04-207280 | 7/1992 |
| JP | 05-191800 | 7/1993 |
| JP | 07-095571 | 4/1995 |
| JP | 09-149421 | 6/1997 |
| JP | 10-023411 | 1/1998 |
| JP | 10-126794 | 5/1998 |
| JP | 2000-125304 | 10/1998 |
| JP | 11-275585 | 10/1999 |
| JP | 2000-013797 | 1/2000 |
| JP | 2001-112004 | 4/2001 |
| JP | 2002-34043 | 1/2002 |
| JP | 2002-325257 | 11/2002 |
| JP | 2003-115765 | 4/2003 |
| JP | 2004-056632 | 2/2004 |

\* cited by examiner

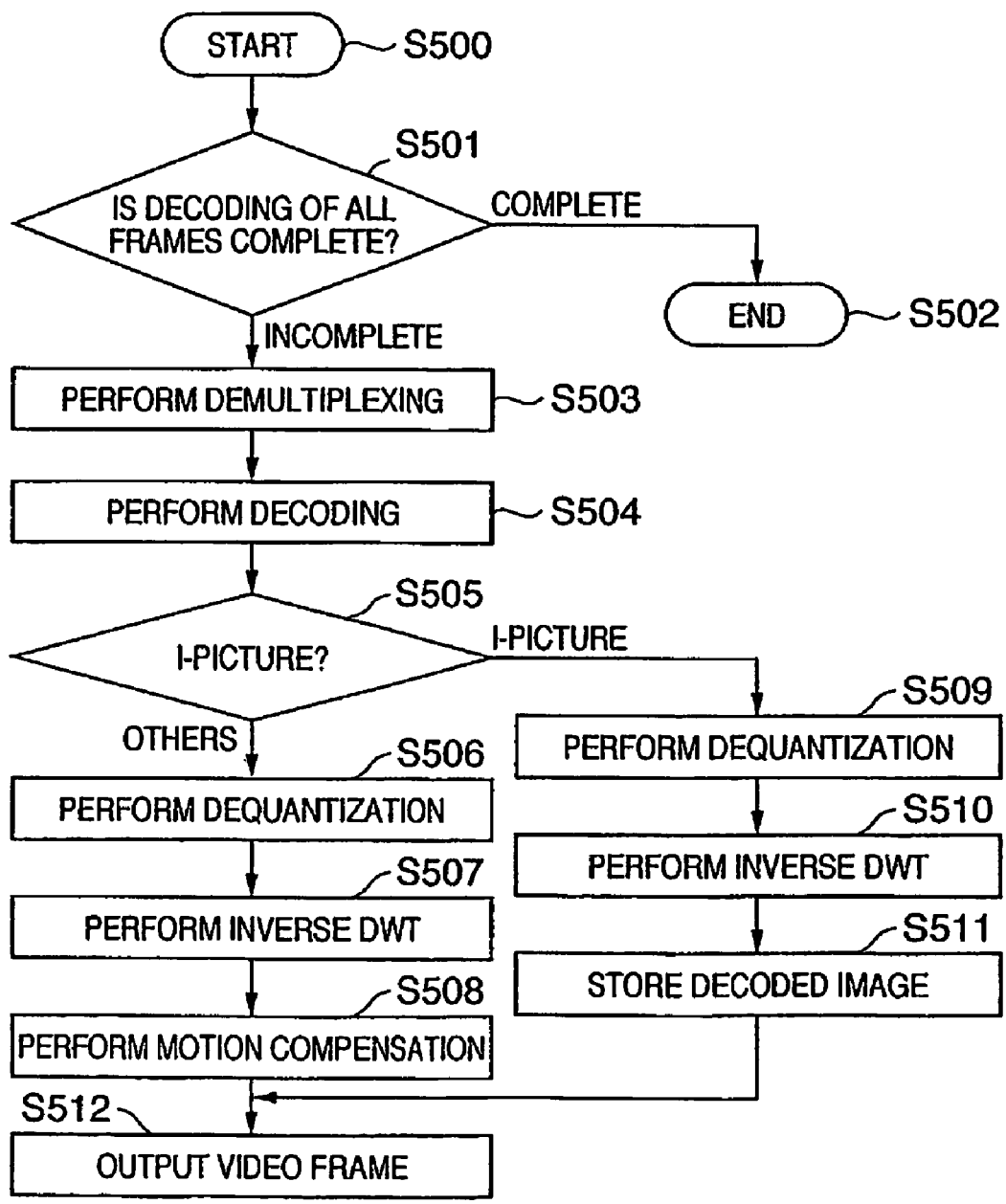

MOVING IMAGE CODING APPARATUS, MOVING IMAGE DECODING APPARATUS, CONTROL METHOD THEREFOR, AND COMPUTER-READABLE STORAGE MEDIUM

This application is a National Stage Filing Under 35 U.S.C. §371 of International Application No. PCT/JP2005/004850, filed Mar. 11, 2005, and published in English as International Publication No. WO 2005/088976 on Sep. 22, 2005, which claims priority to Japanese Patent Application Nos. 2004-071399, filed Mar. 12, 2004 and 2005-015847, filed Jan. 24, 2005, hereby incorporated by reference.

TECHNICAL FIELD

The present invention relates to a coding technique for moving image data.

BACKGROUND ART

Recently, contents flowing on networks, the Internet in particular, have increased in volume and diversity from character information to still image information, further to moving image information. Accordingly, coding techniques for compressing information amounts have been developed. The developed coding techniques have been standardized internationally and widely spread.

On the other hand, networks themselves have increased capacity and diversity, and hence one content from the transmitting side passes through various environments until it reaches the receiving side. In addition, transmitting/receiving-side devices have diversified in terms of processing performance. General-purpose information processing apparatuses such as personal computers (to be referred to as PCs hereinafter) mainly used as transmission/reception devices have exhibited great improvements in performance such as CPU performance and graphics performance. On the other hand, devices with different types of processing performance, e.g., a PDA, cell phone, TV set, and hard disk recorder, have been equipped with network connection functions. Under the circumstances, a great deal of attention has been paid to a function called scalability, which can cope with changing communication line capacities and the processing performance of receiving-side devices with one data.

The JPEG 2000 coding scheme is widely known as a still image coding scheme having this scalability function. This scheme is standardized internationally and described in detail in ISO/IEC15444-1 (Information technology—JPEG 2000 image coding system—Part 1: Core coding system). A characteristic feature of this scheme is that DWT (Discrete Wavelet Transformation) is performed for input image data to discretize the data into a plurality of frequency bands. The coefficients of the respective frequency bands are quantized, and the quantized values are arithmetically coded for each bitplane. This scheme allows fine control of layers by coding or decoding only a necessary number of bitplanes.

In addition, the JPEG 2000 coding scheme has realized a so-called ROI (Region Of Interest) technique of relatively improving the image quality of a region of interest in an image, which does not exist in the conventional coding techniques.

FIG. 8 shows a coding sequence in the JPEG 2000 coding scheme. A tile segmentation unit 9001 segments an input image into a plurality of regions (tiles). This function is optional. A DWT unit 9002 performs discrete wavelet transformation to discretize data into frequency bands. A quantization unit 9003 quantizes each coefficient. This function is however optional. An ROI unit 9007 is optional, which sets a region of interest. A quantization unit 9003 performs shift up. An entropy coding unit 9004 performs entropy coding by the EBCOT (Embedded Block Coding with Optimized Truncation) scheme. A bitplane round-down unit 9005 performs rate control by rounding down lower bitplanes of the coded data, as needed. A code forming unit 9006 adds header information to the data and selects various types of scalability functions, thereby outputting code data.

FIG. 9 shows a decoding sequence in the JPEG 2000 coding scheme. A code analyzing unit 9020 analyzes a header to obtain information for forming layers. A bitplane round-down unit 9021 rounds down lower bitplanes of the input coded data in accordance with the capacity of an internal buffer and the decoding capability. An entropy decoding unit 9022 decodes the coded data based on the EBCOT coding scheme to obtain quantized wavelet transformation coefficients. A dequantization unit 9023 dequantizes the coefficients. An inverse DWT unit 9024 performs inverse discrete wavelet transformation for the dequantized coefficients to reproduce image data. A tile combining unit 9025 combines a plurality of tiles to reproduce image data.

A Motion JPEG 2000 scheme (ISO/IEC15444-3 (Information technology-JPEG 2000 image coding system Part 3: Motion JPEG 2000)) has also been recommended, which performs moving image coding by making this JPEG 2000 coding scheme correspond to each frame of a moving image. According to this scheme, coding is independently performed for each frame, and some redundancy is left between frames because coding is performed without using time correlation. For this reason, it is difficult to effectively reduce the code amount as compared with the moving image coding scheme using time correlation.

In the MPEG coding scheme, motion compensation is performed to improve the coding efficiency. This technique is disclosed in "Latest MPEG Textbook" (ASCII Publishing, p. 76, 1994). FIG. 10 shows a coding sequence in this scheme. A block segmentation unit 9031 segments data into 8×8 pixel blocks. A differential unit 9032 subtracts predicted data from the resultant data by motion compensation. A DCT unit 9033 performs discrete cosine transformation. A quantization unit 9034 performs quantization. The resultant data is coded by an entropy coding unit 9035. A code forming unit 9036 adds header information to the resultant data to output code data.

At the same time, a dequantization unit 9037 dequantizes the data. An inverse DCT unit 9038 performs inverse transformation to discrete cosine transformation. An addition unit 9039 adds predicted data to the resultant data and stores it in a frame memory 9040. A motion compensation unit 9041 obtains a motion vector by referring to the input image and a reference frame stored in the frame memory 9040, thereby generating predicted data.

When the above MPEG coding scheme is to be applied to a scheme designed to perform bitplane coding so as to realize scalability as in JPEG 2000, errors in motion compensation due to abortion of bitplane coding are accumulated to cause a deterioration in image quality. Assume that the DCT unit 9033 and inverse DCT unit 9038 in FIG. 10 are replaced with discrete wavelet transformation and inverse discrete wavelet transformation, bitplane coding is performed by the entropy coding unit 9035, and the bitplane round-down unit 9005 is added to the code forming unit 9036 to round down bitplanes. In this case, the number of bitplanes reproduced in each frame differs from that in a case wherein the bitplane round-down unit 9021 in FIG. 9 rounds down bitplanes. In addition, if a rounded-down lower bitplane is compensated for by 0, the resultant error differs from the original value. If a P-picture or B-picture is generated from a P-picture in MPEG, errors are accumulated, resulting in a deterioration in the image quality of a moving image.

DISCLOSURE OF INVENTION

The present invention has been made to solve the above problems, and has as its object to provide a technique of preventing a deterioration in image quality by suppressing errors due to abortion of bitplane coding from being gradually accumulated in predicted frame images such as P- and B-pictures.

In order to achieve this object, for example, an image coding apparatus of the present invention has the following arrangement.

There is provided a moving image coding apparatus which sequentially inputs and codes image data of frames constituting a moving image, characterized by comprising:

mode selection means for adaptively selecting, for each frame, a first coding mode using inter-frame correlation and a second coding mode of coding a frame separately;

segmentation means for segmenting image data of an input frame into a plurality of blocks;

decoding means for locally decoding coded image data in accordance with an output from the mode selection means;

computation means for extracting predicted data from a locally decoded previous frame on the basis of a block image obtained by segmentation by the segmentation means and outputting a block obtained by subtracting the predicted data from the segmented block image in the first coding mode, and outputting a block segmented by the segmentation means in the second coding mode;

transformation means for transforming the block obtained by the computation means into spatial frequency component data;

coded data generating means for generating intermediate code data for each bitplane comprising bit information at each bit position which represents each frequency component value obtained by transformation;

adjusting means for adjusting a code data amount by rounding down code data of desired bitplanes of generated code data from a least significant bit position to an upper bit position; and output means for outputting code data adjusted by the adjusting means.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

FIG. 13 is a flowchart showing a processing sequence in the fourth embodiment.

BEST MODE FOR CARRYING OUT THE INVENTION

The embodiments of the present invention will be described in detail below with reference to the accompanying drawings.

First Embodiment

Figure 1:
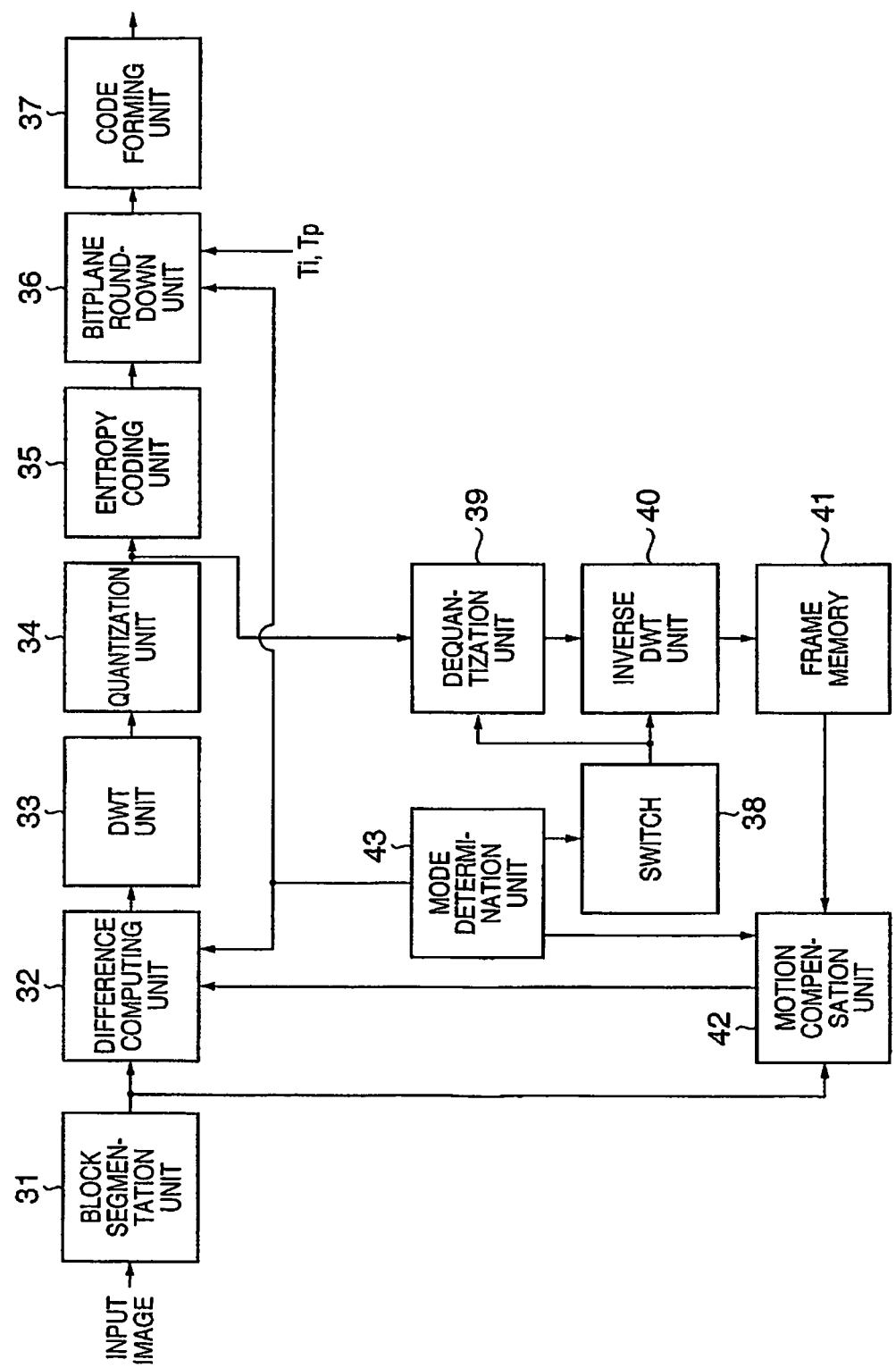
FIG. 1 is a block diagram showing the arrangement of a moving image coding apparatus according to the first embodiment.

FIG. 1 is a block diagram showing the arrangement of a moving image coding apparatus according to the first embodiment. In the first embodiment, as an image coding scheme to be used by the moving image coding apparatus, the Motion JPEG 2000 coding scheme will be described as an example. However, the present invention is not limited to this.

Referring to FIG. 1, reference numeral 31 denotes a block segmentation unit which segments input image data into blocks; 32, a difference computing unit which obtains the difference between the image data and predicted data obtained by motion compensation (to be described later) for the image data; 33, a DWT unit which performs discrete wavelet transformation for the segmented blocks; 34, a quantization unit which quantizes the transformation coefficients obtained by discrete wavelet transformation; 35, an entropy coding unit which performs EBCOT coding based on the JPEG 2000 coding scheme for each bitplane; 36, a bitplane round-down unit which selects the code data of effective upper bitplanes from code data and rounds down lower bitplanes; and 37, a code forming unit which forms coded data from an output from the bitplane round-down unit 36 by generating a necessary header.

Reference numeral 43 denotes a mode determination unit which determines a coding mode for each frame, more specifically determines which one of an intra-frame coding mode and an inter-frame coding mode is to be used; 39, a dequantization unit which dequantizes data from the quantization unit 34; and 40, an inverse DWT unit which performs inverse transformation to the DWT unit 33. The dequantization unit 39 and inverse DWT unit 40 execute processing only when the mode determination unit 43 determines to perform coding by the intra-frame coding mode. For this reason, a switch 38 is provided to give the dequantization unit 39 and inverse DWT unit 40 permission to execute processing, upon receiving the determination result from the mode determination unit 43.

Reference numeral 41 denotes a frame memory in which decoded images (images locally decoded by the dequantization unit 39 and inverse DWT unit 40) for reference for motion compensation are stored. As described above, since the dequantization unit 39 and inverse DWT unit 40 are operated only in the intra-frame coding mode, only the decoded image results of intra-frame-coded images are stored in the frame memory 41. Reference numeral 42 denotes a motion compensation which calculates a motion vector and predicted data by motion prediction from data from the frame memory 41 and an input image.

The operation of the moving image coding apparatus having the above arrangement will be described below. This embodiment will exemplify a case wherein each GOP (Group Of Pictures) comprises only an I-picture obtained by intra-frame coding and P-pictures obtained by inter-frame coding. One GOP comprises 15 frames. In general, in the playback mode, playback is performed at a frame rate of 30 frames/sec, and hence one GOP is equivalent to moving image data of about 0.5 sec. In this embodiment, one frame of one GOP is an I-picture (intra-frame code data) and the remaining 14 frames are P-pictures (inter-frame code data), with the I-picture being generated at a fixed timing. Note that the number of I-pictures may be two or more. As the number of I-pictures in one GOP increases, the quality of a moving image improves, but the code data amount increases. If playback is to be performed at 30 frames/sec and one GOP comprises 15 frames, it is sufficient to have about two I-pictures in one GOP.

The block segmentation unit 31 segments one frame of an input moving image into N×N (N is a natural number) blocks (each block having a size of 32×32 pixels), and sends each block image to the difference computing unit 32 and motion compensation 42. The motion compensation 42 calculates a motion vector from the frame memory 41 with respect to the input block images, and obtains block image data as predicted data. When the mode determination unit 43 selects the inter-frame coding mode, the difference computing unit 32 subtracts the predicted data from the current frame. When the mode determination unit 43 selects the intra-frame coding mode, the difference computing unit 32 directly outputs the information of the input frame to the DWT unit 33 without taking any difference (all the coefficients of predicted data may be set to 0).

The DWT unit 33 performs discrete wavelet transformation for the information, and outputs the resultant information to the quantization unit 34. The quantization unit 34 quantizes the coefficients after the discrete wavelet transformation, and outputs the resultant data to the entropy coding unit 35 and dequantization unit 39. The entropy coding unit 35 codes the quantized coefficients for each bitplane, and outputs the resultant data to the bitplane round-down unit 36. The bitplane round-down unit 36 rounds down bitplanes such that the code amount of one GOP falls within a predetermined code amount, and outputs the resultant data to the code forming unit 37.

Letting Ti be a threshold for the code data amount of an I-picture (intra-frame code data), and Tp be a threshold for the code amount of a P-picture (inter-frame code data), the allowable data amount of one GOP can be expressed by Ti×n+Tp×m (n=1 and m=14 in this embodiment). Let D be the data amount of one frame which the bitplane round-down unit 36 receives from the entropy coding unit 35.

If D≦ti while the intra-frame coding mode is selected, the bitplane round-down unit 36 performs no rounding down. If D>Ti, the bitplane round-down unit 36 rounds down the code data of bitplanes from the least significant bitplane input from the bitplane round-down unit 36 to upper bitplanes until D≦Ti.

For example, letting C(n) be the code data of the nth bitplane, L((Cn)) be the code data amount of the bitplane, and Nmax be the most significant bit, the maximum value of k is found, which satisfies $$L(C(Nmax))+L(C(Nmax-1))+\ldots+L(C(Nmax-k))\leq Ti$$

Then, C(Nmax), C(Nmax−1), . . . , C(Nmax−k) are output as effective code data, and code data C(Nmax−k−1), C(Nmax−k−2), . . . , C(0) are discarded.

The above description applies to the case of a P-picture. The case of a P-picture, however, differs from the above case in that the threshold is defined by Tp. An I-picture serves as a reference for the generation of a P-picture, and is required to have high image quality. In addition, an I-picture is a picture obtained by intra-frame coding, the threshold Ti and Tp have the relationship represented by Ti>Tp. As a consequence, the data amount of one GOP can be maintained equal to or less than the allowable data amount. Note that thresholds Ti and Tp may be determined, as required.

The code forming unit 37 adds header information to the code data, and outputs the resultant code data.

As described above, the dequantization unit 39 and inverse DWT unit 40 function only when the switch 38 is turned on on the basis of information from the mode determination unit 43 which indicates the intra-frame coding mode. Consequently, any data that has passed through the dequantization unit 39 and inverse DWT unit 40 is decoded image data (not difference data). This decoded image data is stored in the frame memory 41. In this embodiment, since one GOP includes one I-picture, the frame memory 41 is updated at 15-frame intervals. Obviously, when one GOP is to include two or three I-pictures, the frame memory 41 is updated at the corresponding intervals.

The motion compensation 42 obtains a motion vector by referring to an input image and the reference frames stored in the frame memory 41 and generates predicted data only when the current target frame (to be coded) is to be inter-frame-coded.

Figure 2:
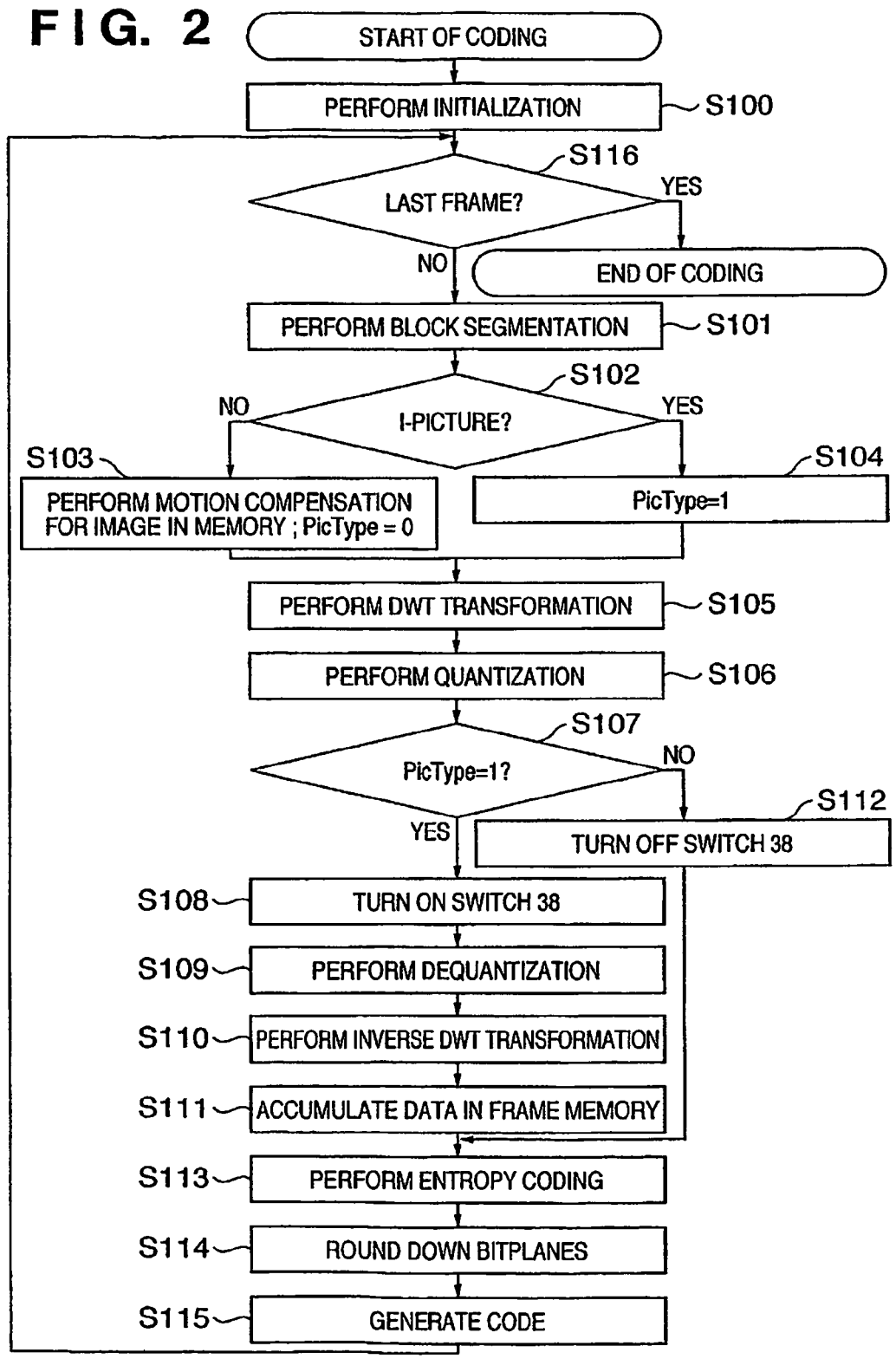
FIG. 2 is a flowchart showing a moving image coding sequence in the first embodiment.

A simple flow of the above moving image coding processing will be described with reference to the flowchart of FIG. 2. FIG. 2 is a flowchart showing a processing sequence in the moving image coding apparatus according to the first embodiment.

First of all, in step S100, when coding is started, a picture type flag PicType representing a coding mode is initialized to 0, and a counter cnt is initialized to 0. If the picture type flag PicType is 0, it indicates the inter-frame coding mode. If the picture type flag PicType is 1, it indicates the intra-frame coding mode. The counter cnt counts up every time a frame is input. When this value exceeds 14, the counter is reset to "0". That is, the counter repeatedly counts within the range of 0 to 14. This is because, in this embodiment, 1 GOP=15 frames, and one GOP includes one I-picture.

If it is determined in step S116 that frame input is not complete, the processing in step S101 and the subsequent steps is repeated. Note that if, for example, the apparatus of this embodiment is a video camera, whether or not frame input is complete is determined by determining whether or not a record button (not shown) is turned off. Alternatively, the end of frame input may be determined by determining whether or not a set frame count (or time) has been reached.

When the flow advances to step S101, a one-frame image is input and segmented into blocks for wavelet transformation. At this time, the counter cnt is incremented by "1". In step S102, it is determined whether or not now is the timing for the input frame to be coded as an I-picture. This determination is done depending on whether or not counter cnt=1.

If it is determined that counter cnt=1, the flow advances to step S104 to set the flag PicType to "1,", and coding in the intra-frame coding mode is set for the input frame. If the counter cnt is not "1", the flag PicType is set to "0" in step S103 to code the input frame in the inter-frame coding mode.

When the processing in step S103 or S104 is performed, the flag PicType is set to "0" or "1". This determination is done by the mode determination unit 43 in FIG. 1. The mode determination unit 43 supplies the value to which the flag PicType is set, as a signal, to the difference computing unit 32, dequantization unit 39, inverse DWT unit 40, and bitplane round-down unit 36 in FIG. 1. If the supplied signal is "1", the difference computing unit 32 directly supplies each input pixel block to the DWT unit 33 without using a signal from the motion compensation 42. If the supplied signal is "0", the difference computing unit 32 computes the difference between a pixel block from the motion compensation 42 and an input block, and supplies the result to the DWT unit 33.

The bitplane round-down unit 36 selects either the threshold Ti or Tp in accordance with a signal from the mode determination unit 43, and rounds down the code data of bitplanes from the least significant bitplane to an upper bitplane such that the resultant code amount becomes equal to or less than the selected threshold.

The flow then advances to step S105 to make the difference computing unit 32 perform DWT transformation for each block from the difference computing unit 32. In step S106, the quantization unit 34 is made to perform quantization processing.

It is determined in step S107 whether or not the flag PicType is "1", i.e., the intra-frame coding mode is selected. If it is determined that flag PicType is "1", the switch 38 is turned on in step S108 to set up the dequantization unit 39 and inverse DWT unit 40 to function. If the flag PicType is "0", the switch 38 is turned off to skip the processing in steps S109 to S111.

When the flow advances to step S109, the dequantization unit 39 is made to perform dequantization processing. In step S110, inverse DWT transformation is performed. In step S111, the image data of the transformation result is stored in the frame memory 41, thereby updating the frame memory 41.

In step S113, the entropy coding unit 35 is made to perform entropy coding. This entropy coding is also the processing of generating code data for each bitplane.

In step S114, the bitplane round-down unit 36 is made to round down the code data of bitplanes from the least significant bitplane to an upper bitplane such that the resultant code data falls within a set threshold. In step S115, a predetermined header (including information indicating that the corresponding picture is an I- or P-picture) is added to one-frame code data to generate code data. The code data is then output. Thereafter, the flow of processing returns to step S116 to repeat the above processing.

As described above, according to this embodiment, in moving image coding in which bitplane coding is performed and bitplanes are rounded down to perform code amount control, motion compensation is performed for a frame subjected to inter-frame coding by referring to only an intra-frame-coded frame image. This prevents the accumulation of errors due to motion compensation on the decoding side, i.e., the accumulation of errors when P-pictures are generated from P-pictures. Therefore, moving image code data can be generated while a deterioration in image quality is suppressed.

In this embodiment, one GOP comprises 15 frames, one frame of one GOP is formed from one I-picture, and the remaining 14 frames are formed from P-pictures. However, a P-picture near the end of the GOP is temporally away from the I-picture, and hence it is highly possible that the motion compensation accuracy will degrade. In such a case, the number of I-pictures may be set to two or three, and P-pictures may be uniformly assigned between the I-pictures. This makes it possible to cope with image data including an object with relatively large motion.

In this embodiment, whether or not an I-picture is to be generated is determined in accordance with the count value obtained by counting the number of frames. However, whether or not an I-picture is to be generated may be determined in accordance with the size of code data amount per unit time (or a predetermined GOP count). In this case, since an I-picture should hot be generated in a fixed manner, code data is preferably generated under the condition that at least one P-picture should be generated after the generation of an I-picture.

In this embodiment, only I- and P-pictures have been described. However, the present invention is not limited to this, and B-pictures which are bidirectionally predicted pictures may also be used. In the case of a B-picture, since two frames are referred to, the capacity of the frame memory is increased to store 2-frame images to be referred to in the frame memory, thereby realizing operation using B-pictures.

Each process in FIG. 1 in this embodiment may be implemented by software executed by a personal computer or the like. In this case, input of moving image data can be handled by equipping the apparatus with a video capture card or the like. In general, a computer program can be executed by setting a computer-readable storage medium such as a CD-ROM storing the program and copying or installing the program in the system, and hence such a computer-readable storage medium is included in the category of the present invention.

The coding scheme is not limited to the JPEG 2000 coding scheme, and an extended layer coding scheme in FGS coding in the MPEG-4 coding scheme may be used.

In addition, B-pictures formed by bidirectional prediction may be used. In this case, this embodiment can be implemented by performing motion compensation by referring to adjacent I-pictures.

Figure 11:
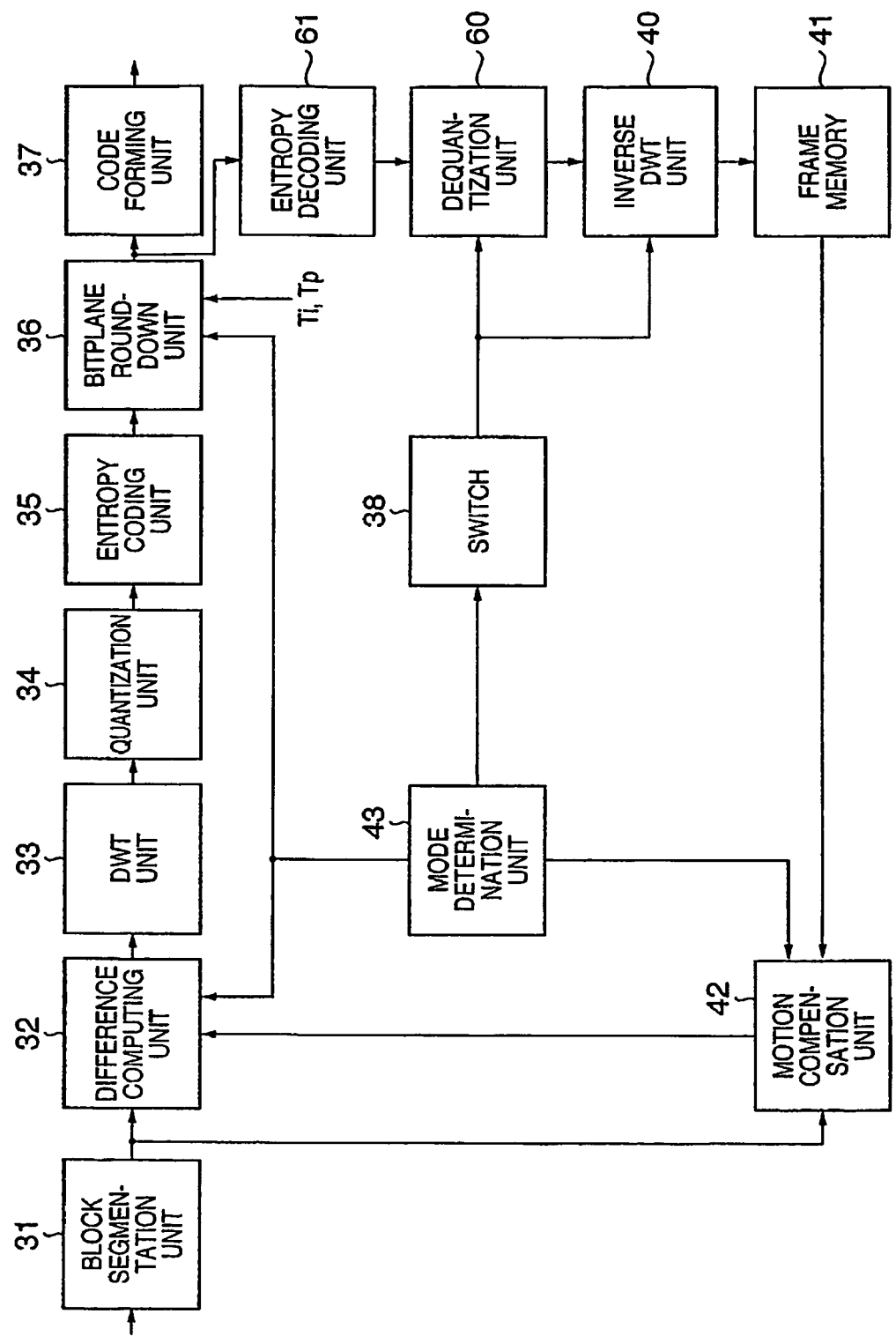
FIG. 11 is a block diagram showing another arrangement of the moving image coding apparatus according to the first embodiment.

In this embodiment, the quantized coefficients are dequantized to obtain a decoded image. However, the present invention is not limited to this. FIG. 11 is a view showing an arrangement in which coefficients after bit rounding down are dequantized to obtain a decoded image. Referring to FIG. 11, a dequantization unit 60 which has received the decoding result obtained by an entropy decoding unit 61 has a function of performing a shift by an amount corresponding to the bits rounded down. This makes it possible to implement a moving image coding apparatus in consideration of bit rounding down.

Second Embodiment

Figure 3:
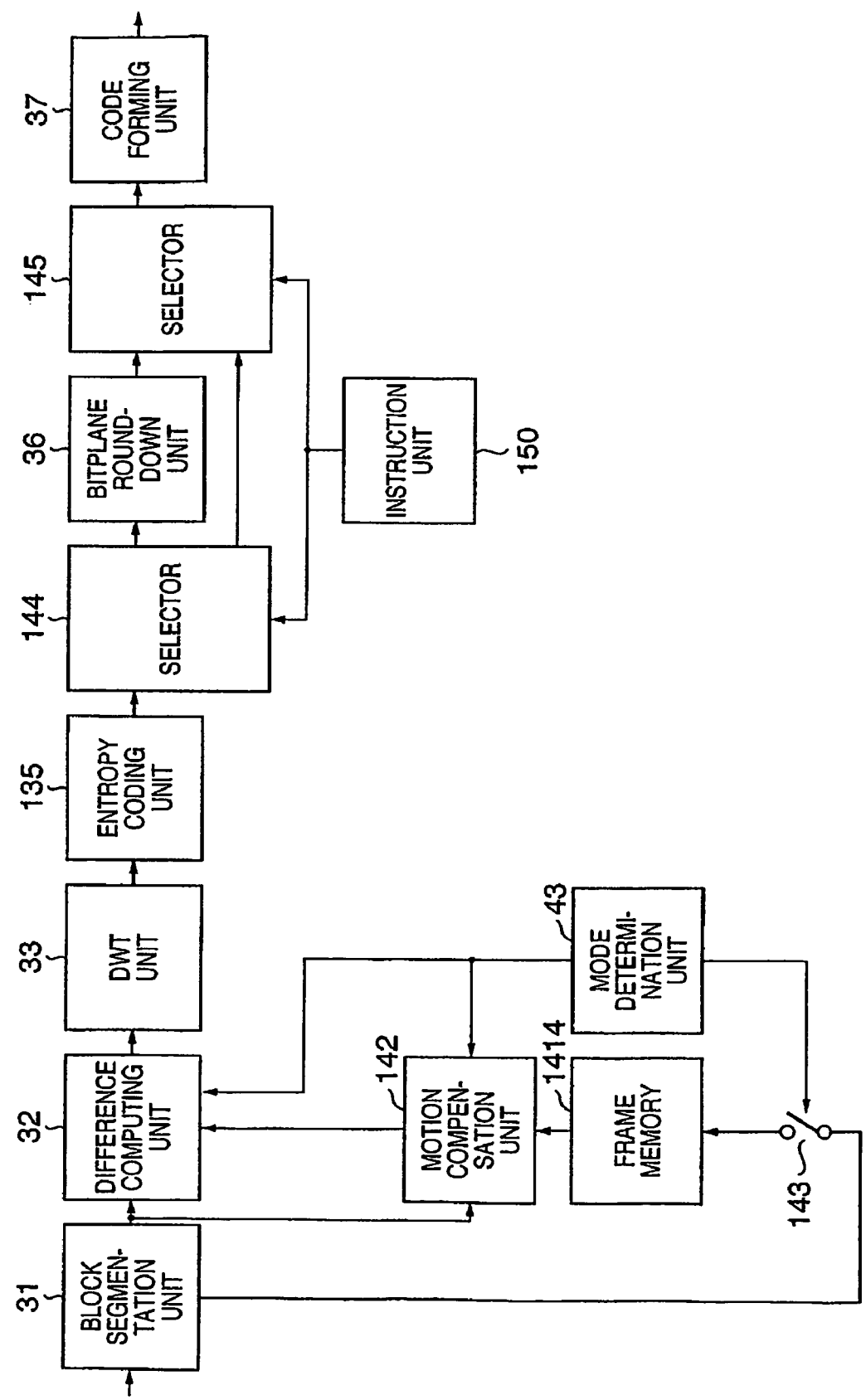
FIG. 3 is a block diagram showing the arrangement of a moving image coding apparatus according to the second embodiment.

FIG. 3 is a block diagram showing the arrangement of a moving image coding apparatus according to the second embodiment of the present invention. The same reference numerals as in FIG. 1 denote the parts having the same functions in FIG. 3, and a description thereof will be omitted.

Referring to FIG. 3, reference numeral 1414 denotes a frame memory which stores input image data; 142, a motion compensation unit which performs motion prediction from data from the frame memory 1414 and an input image and calculates a motion vector and predicted data; and 143, a switch which controls its output in accordance with an output from a mode determination unit 43. Upon receiving a signal indicating the intra-frame coding mode, the switch 143 overwrites each input block on the frame memory 1414. Upon receiving a signal indicating the inter-frame coding mode, the switch 143 is turned off and any data is not written in the frame memory 1414. With this operation, the image data of an intra-frame-coded frame before the input current frame is stored and held in the frame memory 1414, as in the first embodiment.

Reference numeral 135 denotes an entropy coding unit which codes the transformation coefficients formed by a DWT unit 33 for each bitplane; and 144 and 145, selectors which select inputs and outputs in accordance with lossless selection signals supplied from an external instruction unit 150.

Lossless coding operation in the moving image coding apparatus having the above arrangement will be described below. As in the first embodiment, a case wherein a GOP comprises only I- and P-pictures will be described. This embodiment will exemplify JPEG 2000. However, the present invention is not limited to this.

As in the first embodiment, a block segmentation unit 31 segments an input frame into blocks and sends them to a difference computing unit 32, the motion compensation unit 142, and the switch 143. The mode determination unit 43 generates a signal representing either the intra-frame coding mode or the inter-frame coding mode as a coding mode for an input frame, and outputs the signal to the difference computing unit 32, motion compensation unit 142, and switch 143.

When the mode determination unit 43 receives a signal representing the inter-frame coding mode for the current frame, the difference computing unit 32 subtracts predicted data based on motion compensation from each block segmented by the block segmentation unit 31. When the mode determination unit 43 receives a signal representing the intra-frame coding mode, the difference computing unit 32 directly outputs the information of the input frame to a DWT unit 33 without performing difference computation. The DWT unit 33 performs discrete wavelet transformation, codes the coefficients after discrete wavelet transformation, which are to be output to an entropy coding unit 135, for each bitplane, and outputs the resultant data to a code forming unit 37. The entropy coding unit 135 codes the quantized coefficients and outputs the resultant data to the selector 144. Upon receiving an external instruction to perform lossless coding, the selector 144 directly outputs the data coded by the entropy coding unit 135 to the code forming unit 37 without through a bitplane round-down unit 36. Upon receiving an instruction to perform lossy coding, the selector 144 supplies the code data generated by the entropy coding unit 135 to the bitplane round-down unit 36, and supplies the result to the code forming unit 37.

The bitplane round-down unit 36 performs the same processing as in the first embodiment. That is, the bitplane round-down unit 36 rounds down the coded data of bitplanes such that the resultant code data amount falls within a predetermined code amount. The code forming unit 37 adds header information to the code and outputs the code data.

Upon receiving a signal representing the intra-frame coding mode from the mode determination unit 43, the switch 143 is turned on to send and write an input frame in the frame memory 1414. At this time, the motion compensation unit 142 does not operate and outputs 0 as predicted data to the difference computing unit 32. Upon receiving a signal representing the inter-frame coding mode, the switch 143 is turned off so as not to send an input frame to the frame memory 1414 (so as not to update the frame memory 1414). The motion compensation unit 142 obtains a motion vector by referring to the current target frame (to be coded) as an input image and a reference frame stored in the frame memory 1414, and generates predicted data. That is, the frame memory 1414 holds its information until the information is overwritten.

Figure 4:
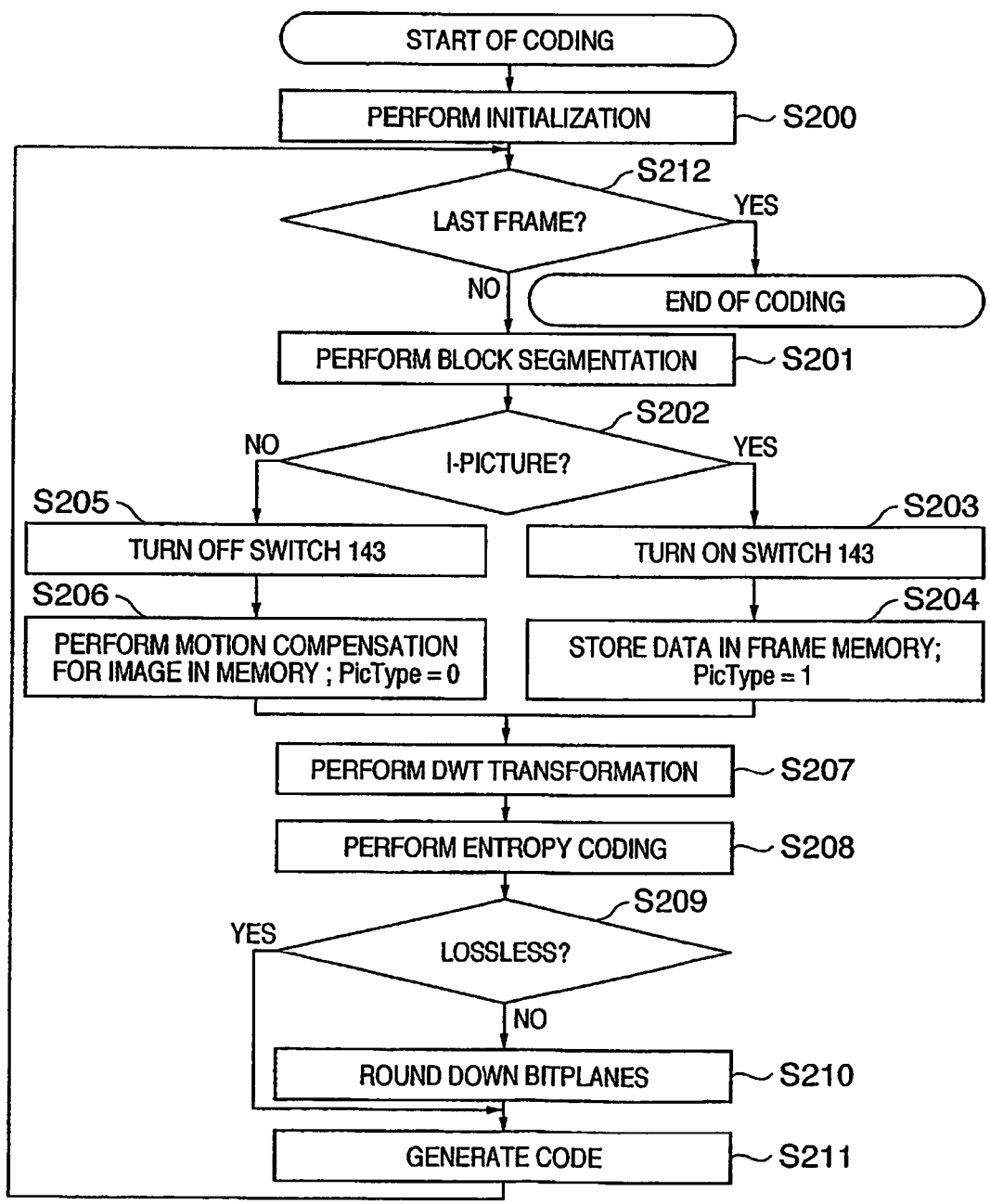
FIG. 4 is a flowchart showing a moving image coding sequence in the second embodiment.

A simple flow of the above moving image coding processing in the moving image coding apparatus according to the second embodiment will be described with reference to the flowchart of FIG. 4.

In step S200, each parameter is initialized. The processing in step S201 and the subsequent steps is repeated until it is determined in step S212 that coding processing is complete. The processing in steps S200 and S212 is the same as that in steps S100 and S116 in the first embodiment.

When the flow advances to step S201, a one-frame image is received and segmented into blocks for wavelet transformation. At this time, the counter cnt is incremented by "1". In step S202, it is determined whether or not now is the timing at which an input frame is coded as an I-picture. This determination is performed by determining whether or not counter cnt=1.

When it is determined that code data for an I-picture is to be formed, the switch 143 is turned on in step S203. In step S204, the input frame image is stored in the frame memory 1414 to update it, and the flag PicType is set to "1".

When the input frame is to be coded as a P-picture, the switch 143 is turned off in step S205 so as not to update the frame memory 1414. In step S206, motion compensation is performed between the image stored in the frame memory 1414 and the input image data, and the difference computing unit 32 is made to output the result, and the flag PicType is set to "0".

In step S207, the input image data or difference image data is subjected to discrete wavelet transformation in the DWT unit 33. In step S208, the resultant data is entropy-coded for each bitplane.

It is determined in step S209 whether or not an instruction to perform lossless coding is issued. If an instruction to perform lossy coding is issued, bitplane rounding down processing is performed in step S210. If an instruction to performed lossless coding is issued, the processing in step S210 is skipped.

In step S211, code data is input, and a necessary header and the like are added to the data to form a code. The code is then output. Thereafter, the flow returns step S212 to repeat the processing in step S201 and the subsequent steps until the last frame is determined.

As described above, according to the second embodiment, in moving image lossless coding in which bitplane coding is performed, when inter-frame coding is performed, the same function and effect as those in the first embodiment can be obtained by performing motion compensation by referring to only the frame images which have been subjected to intra-frame coding in the past. In addition, the second embodiment requires neither the dequantization unit nor inverse DWT unit in the first embodiment, and hence can be implemented by hardware with a small circuit size. When the second embodiment is to be implemented by software, the load imposed on the CPU can be reduced. In addition, according to the second embodiment, since whether to perform bitplane rounding down processing is performed can be selected as needed, this technique can also cope with lossy coding.

In this embodiment, only I- and P-pictures have been described. However, the present invention is not limited to this. Even if B-pictures which are bidirectionally predicted pictures are introduced, the embodiment can be implemented by increasing the capacity of the frame memory and referring to I-pictures in the same manner.

Each process in FIG. 3 in this embodiment may be implemented by software executed by a personal computer or the like. In this case, input of moving image data can be handled by equipping the apparatus with a video capture card or the like. In general, a computer program can be executed by setting a computer-readable storage medium such as a CD-ROM storing the program and copying or installing the program in the system, and hence such a computer-readable storage medium is included in the category of the present invention.

The coding scheme is not limited to the JPEG 2000 coding scheme, and an extended layer coding scheme in FGS coding in the MPEG-4 coding scheme may be used.

Third Embodiment

Figure 5:
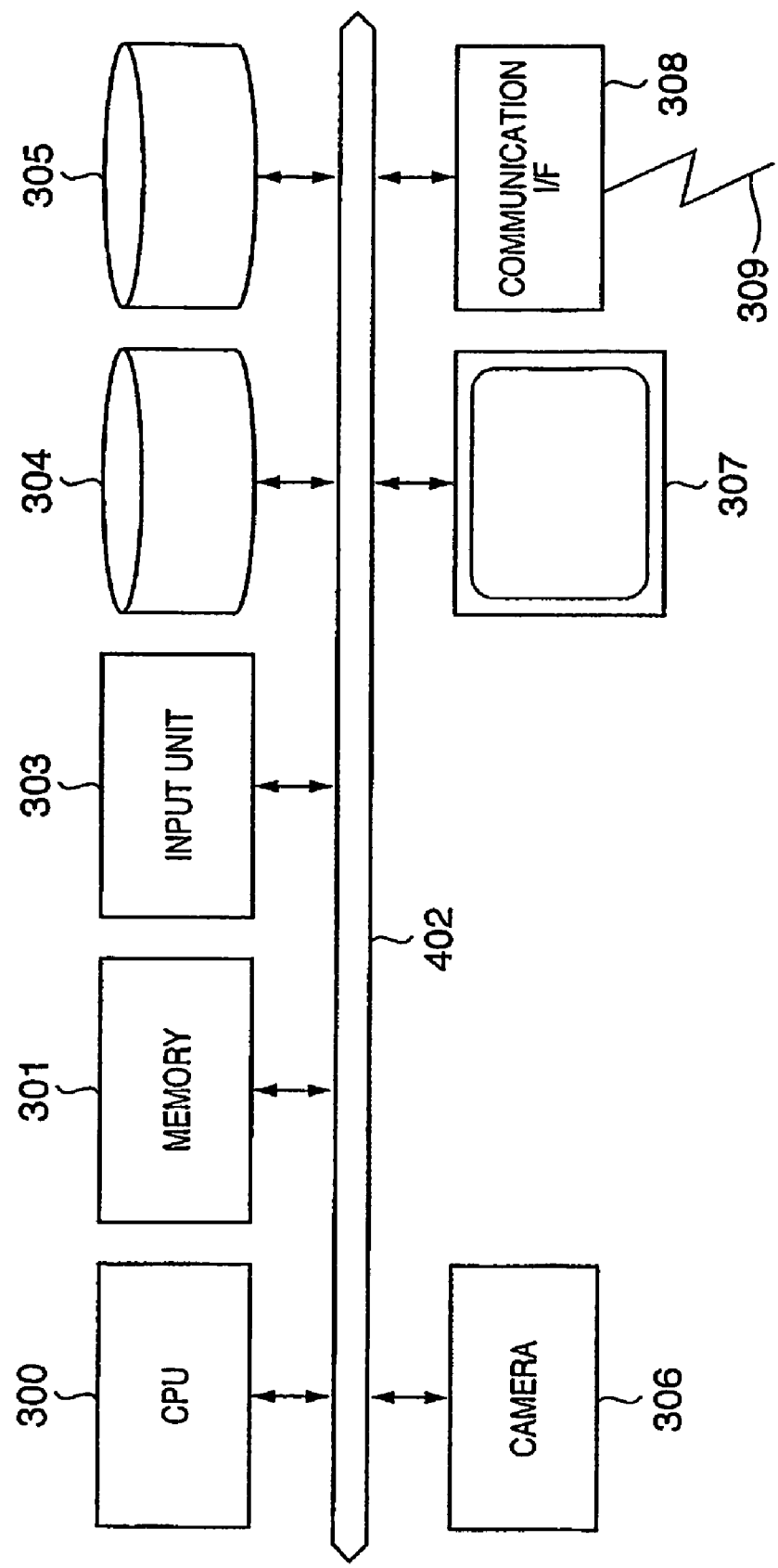
FIG. 5 is a block diagram showing the arrangement of a moving image coding apparatus according to the third embodiment.

The third embodiment will be described next. FIG. 5 is a block diagram showing the arrangement of a moving image coding apparatus according to the third embodiment.

Referring to FIG. 5, reference numeral 300 denotes a central processing unit (CPU) which controls the overall apparatus and performs various types of processing; 301, a memory which provides an operating system (OS) required to control this apparatus, a computer program for image compression processing, and a storage area for arithmetic operation; and 402, a bus which connects various kinds of devices to each other to exchange data and control signals.

Reference numeral 303 denotes an input unit comprising switches for issuing instructions to start up the apparatus, set various kinds of conditions, and play back, and a pointing device such as a keyboard or mouse (trademark); 304, a storage device (e.g., a hard disk) which stores the above OS and various kinds of software; and 305, a storage device which stores streams in a storage medium. As the storage medium, a rewritable CD disk, DVD disk, magnetic tape, or the like is used. Reference numeral 306 denotes a camera which senses a moving image; 307, a monitor which displays an image; 309, a communication line comprising a LAN, public line, radio channel, broadcast wave, and the like; and 308, a communication interface which transmits/receives streams through the communication line 309.

An OS which controls the overall apparatus and causes various kinds of software to operate and software which is made to operate are stored in the memory 301. The memory 301 includes an image area for storing image data, a code area for storing generated code data, and a working area in which parameters and the like for various kinds of computations and coding operations, data associated with watermarking, and the like are stored.

Moving image coding processing in this arrangement will be described. The following will exemplify a case wherein image data input from the camera 306 is coded and output to the communication line 309.

Figure 7:
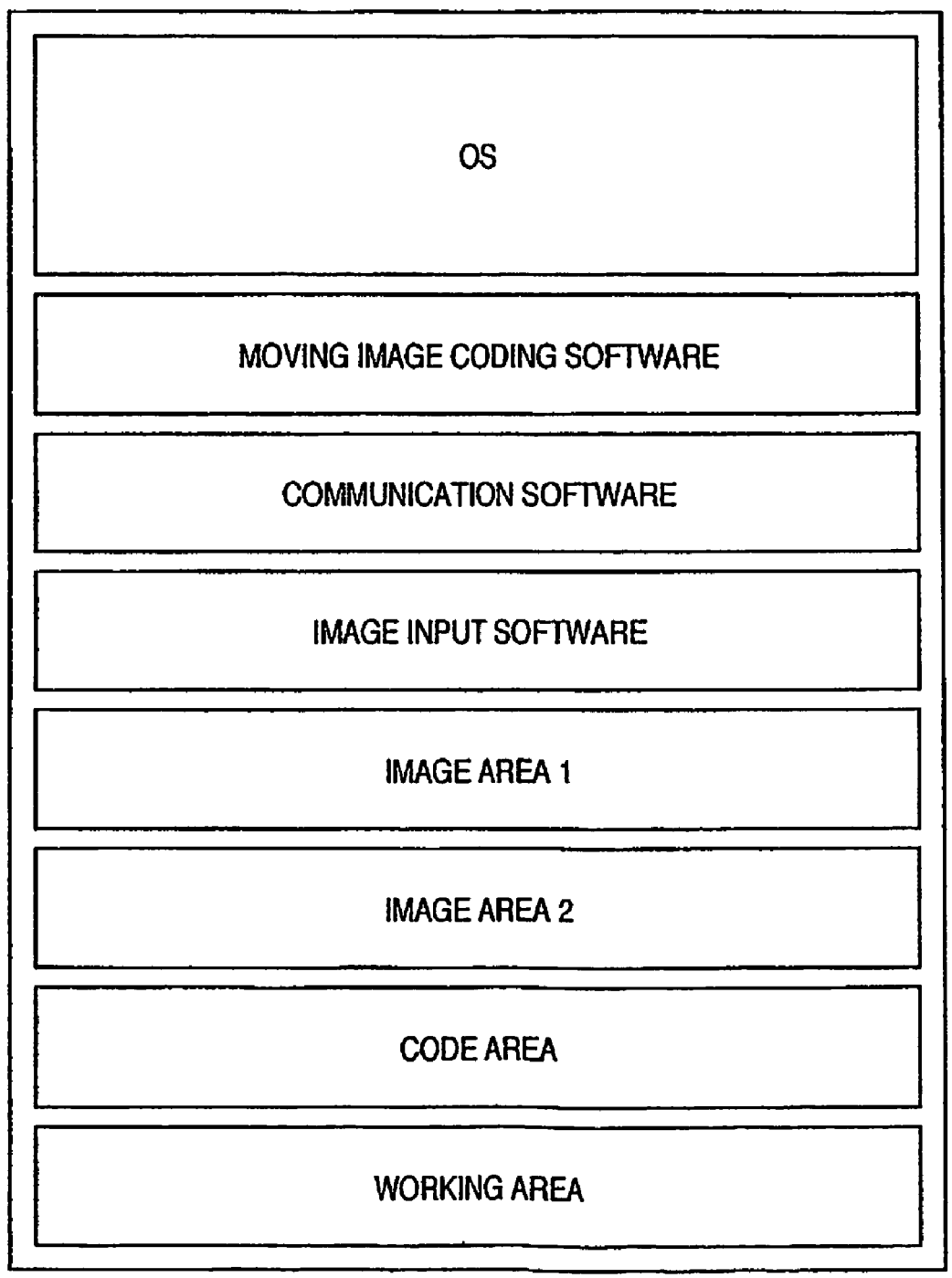
FIG. 7 is a view showing a memory map during processing in the third embodiment.
Figure 8:
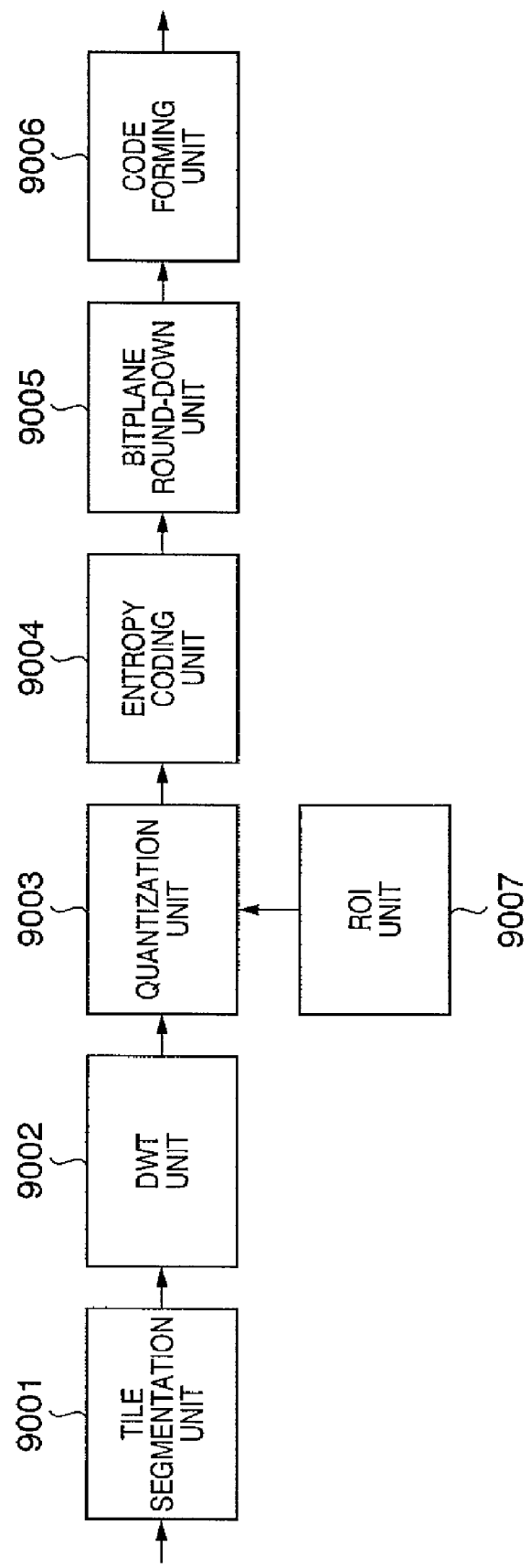
FIG. 8 is a block diagram showing the arrangement of an image coding apparatus based on JPEG 2000.
Figure 9:
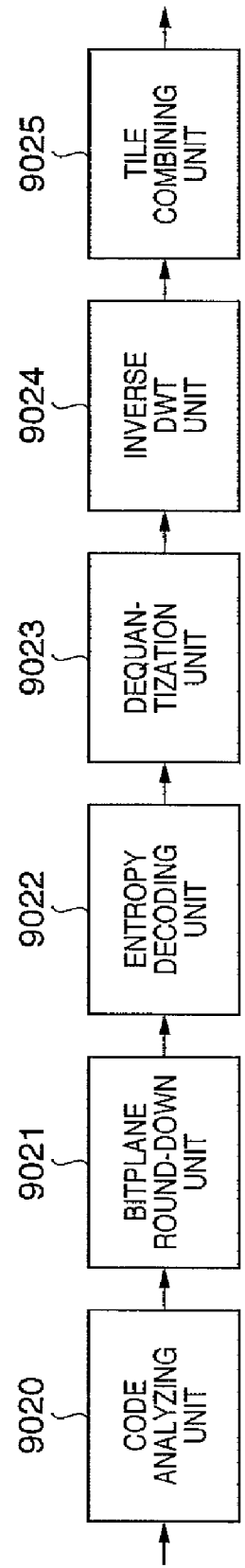
FIG. 9 is a block diagram showing the arrangement of a decoding apparatus based on JPEG 2000.
Figure 10:
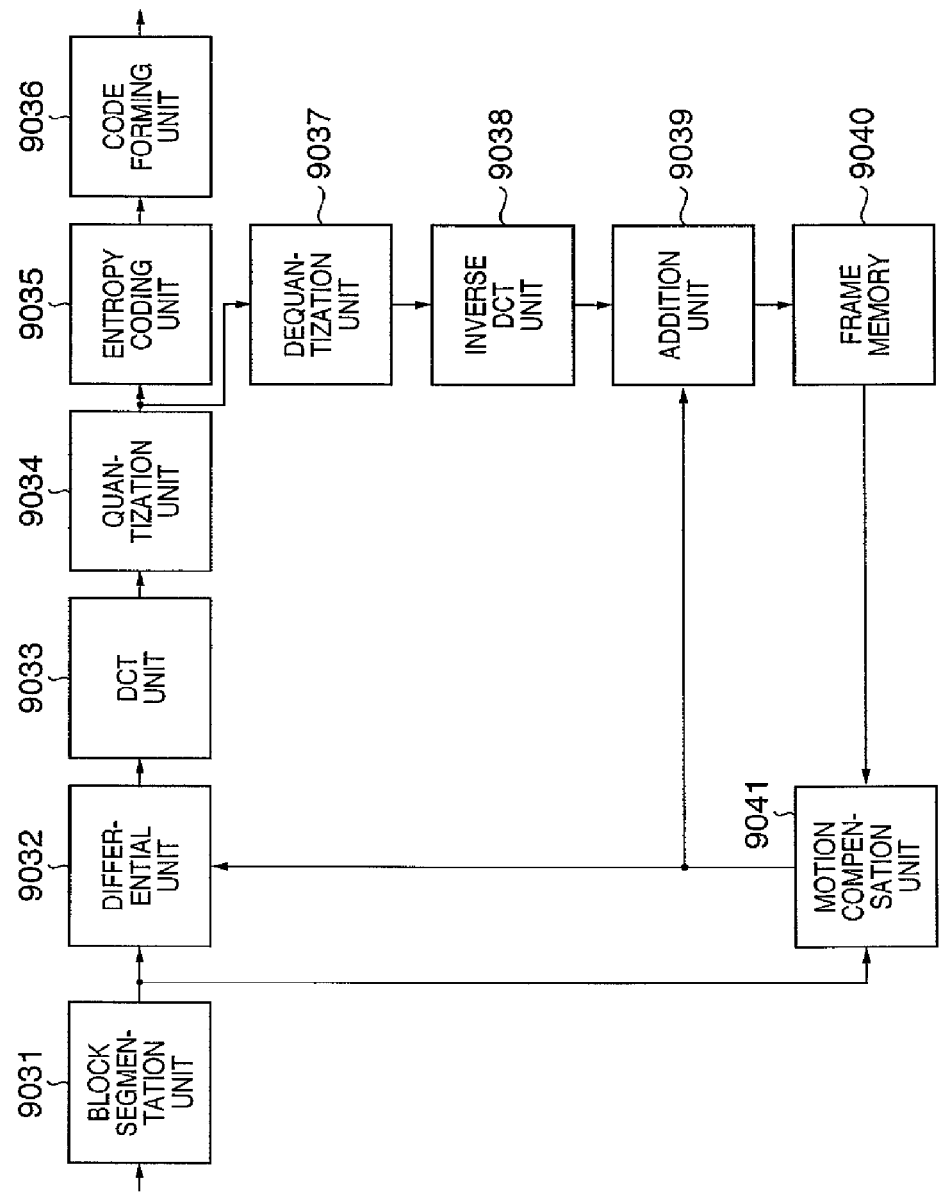
FIG. 10 is a block diagram showing the arrangement of a conventional moving image coding apparatus.

FIG. 7 shows how the memory 301 is used and how software and the like are stored in it. The following are stored in the memory 301: an OS which controls the overall apparatus and causes various kinds of software to operate; moving image coding software for moving image coding; object extraction software for extracting an object from a moving image; communication software for communication; and image input software for inputting an moving image from the storage device 305 for each frame. Although moving image coding software based on the Motion JPEG 2000 coding scheme will be described as an example, the present invention is not limited to this.

Before the processing, the input unit 303 issues an instruction to start up the overall apparatus, and the respective components are initialized. An instruction to keep or not to keep compatibility with the Motion JPEG 2000 coding scheme is input from the input unit 303, and software stored in the storage device 304 is loaded in the memory 301 through the bus 402. The software is activated.

In this arrangement, before the processing, the code area and working area in the memory 301 are cleared to 0. When compatibility with JPEG 2000 coding is to be kept, since the image area 2 is not used, the image area is open.

The image input software stores image data sensed by the camera 306 in the image area in the memory 301 frame by frame. Thereafter, the object extraction software extracts an object from the image in the image area and stores its shape information in the image area.

Figure 6:
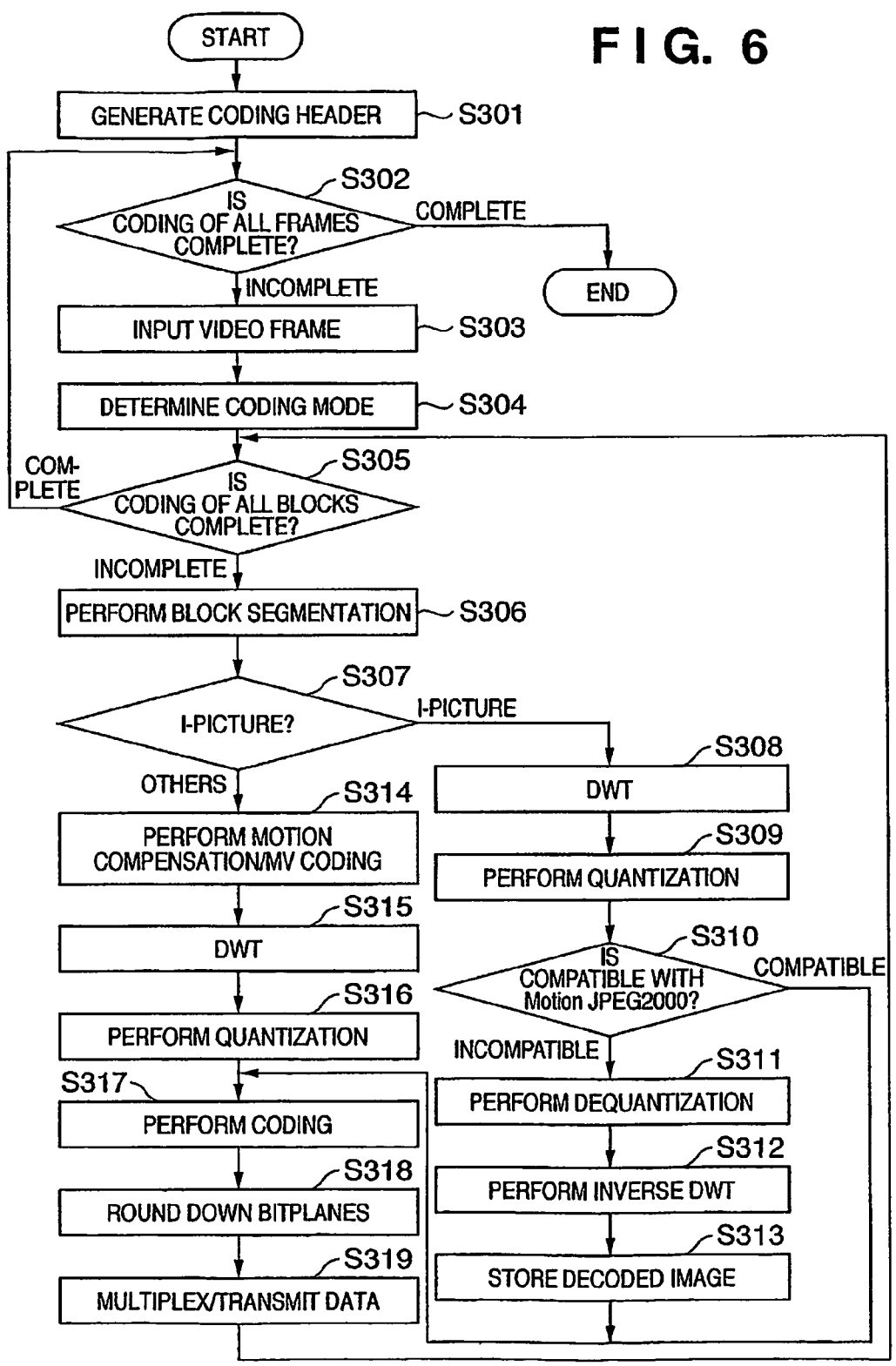
FIG. 6 is a flowchart showing a moving image coding sequence in the third embodiment.

Coding operation based on the moving image coding software executed by the CPU 300 will be described next with reference to the flowchart of FIG. 6.

First of all, in step S301, a header necessary for the Motion JPEG 2000 coding scheme is generated and stored in the code area allocated on the memory 301. When code data is stored in the code area, the communication software sends out the data to the communication line 309 through the communication interface 308. After the data is sent out, the corresponding region in the code area is cleared. Subsequently, no particular reference is made to the transmission of code data in the code area.

In step S302, it is determined whether the coding processing is terminated. If an instruction to terminate the coding processing is input from the input unit 303, all the processing is terminated. Otherwise, the flow advances to step S303.

As the processing in step S303 proceeds, image data is read from the image area in the memory 301. In step S304, it is determined whether to intra-frame-code or inter-frame-code the frame to be coded. If an instruction to keep compatibility with Motion JPEG 2000 is input from the input unit 303, the intra-frame coding mode is determined. The determination result is stored in the working area in the memory 301. In addition, information indicating whether or not to keep compatibility with Motion JPEG 2000 is stored in the working area.

In step S305, it is determined whether or not the processing for all the blocks is complete. If the coding processing for all the blocks is complete, the flow return to step S302 to perform coding processing for the next frame. Otherwise, the flow advances to step S306.

In step S306, a block to be coded is extracted from the image area in the memory 301 and stored in the working area. If it is determined in step S307 by referring to the coding mode in the working area in the memory 301 that intra-frame coding (for an I-picture) is to be performed, the flow advances to step S308. Otherwise, the flow advances to step S314.

In step S308, discrete wavelet transformation is performed for the block data stored in the working area, and the obtained transformation coefficients are stored again in that portion of the working area in which the block data has been stored. In step S309, the transformation coefficients stored in the working area are quantized, and the obtained quantization result is stored in the area in which the transformation coefficients have been stored in the previous processing in the working area.

In step S310, information representing compatibility with Motion JPEG 2000 in the working area in the memory 301 is referred to, if compatibility is ensured, the flow advances to step S317. Otherwise, the flow advances to step 311.

In step S311, the quantization result stored in the working area in the memory 301 is dequantized, and the obtained transformation coefficients are stored in that portion of the working area in which the quantization result has been stored. In step S312, inverse discrete wavelet transformation is performed for the transformation coefficients stored in the working area. In step S313, the obtained image data is stored in an image area 2. The image stored in the image area 2 corresponds to the data in the frame memory 41 in the first embodiment.

If it is determined in step S307 that the target picture is other than an I-picture, motion compensation is performed between the decoded image stored in the image area 2 and the block extracted from the input image data, and a motion vector and predicted error data are calculated. The motion vector data is coded in the same manner as motion vector coding in MPEG-4 coding, and is stored in the code area in the memory 301. The predicted error data is stored in the working area in the memory 301.

In step S315, discrete wavelet transformation is performed for the predicted error data stored in the working area in the memory 301, and the obtained transformation coefficients are stored in that portion of the working area in which the block data has been stored. In step S316, the transformation coefficients stored in the working area are quantized, and the obtained quantization result is stored in that portion of the working area in which the transformation coefficients have been stored.

In step S317, the quantization result obtained in step S309 or S316 is coded for each bitplane and stored in the working area in the memory 301. In step S318, code data which can be transmitted by rate control is selected from the code data stored in the working area, and is stored in the code area in the memory 301. In step S319, the code data in the code area are multiplexed and transmitted. Thereafter, the working area and code area are cleared. The flow of processing then returns to step S305.

Such a series of operations make it possible to select the scheme capable of performing coding with high compatibility with the conventional still image coding scheme or the inter-frame coding scheme.

Note that the moving image coding processing in the first and second embodiments may be implemented by software and the moving image coding apparatus of the third embodiment may be implemented by hardware.

Fourth Embodiment

Figure 12:
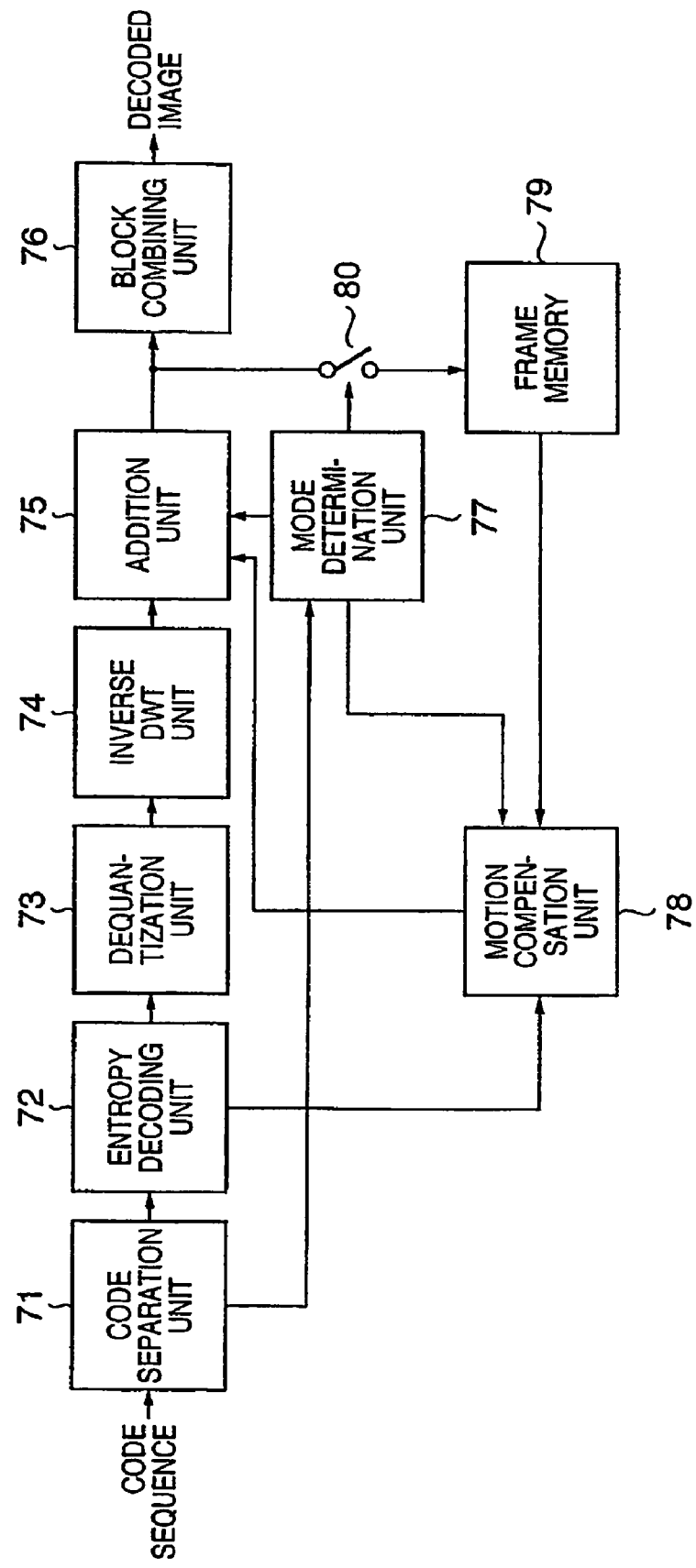
FIG. 12 is a block diagram showing the arrangement of a moving image decoding apparatus according to the fourth embodiment.

FIG. 12 is a block diagram showing the arrangement of a moving image decoding apparatus according to the fourth embodiment.

In the fourth embodiment, as an image coding scheme to be used by the moving image decoding apparatus, the Motion JPEG 2000 coding scheme will be described as an example. However, the present invention is not limited to this.

Referring to FIG. 12, reference numeral 71 denotes a code separation unit which separates a code sequence into header information and an image code data sequence; 72, an entropy decoding unit which performs EBCOT decoding processing based on the JPEG 2000 coding scheme for the above code sequence for each bitplane; 73, a dequantization unit which dequantizes decoded quantized coefficients; and 74, an inverse DWT unit which performs inverse DWT transformation for DWT coefficients.

Reference numeral 77 denotes a mode determination unit which determines a coding mode for each frame, and determines either the intra-frame coding mode or the inter-frame coding mode; 75, an addition unit which obtains the sum of image data and predicted data obtained by motion compensation (to be described later) for the image data; 79, a frame memory in which a decoded image to be referred to for motion compensation. Note that only when the mode determination unit 77 determines that decoding is performed in the intra-frame coding mode, a decoded image is stored in the frame memory 79. For this purpose, a switching device 80 is provided to store an output from the addition unit 75 in the frame memory 79.

Reference numeral 78 denotes a motion compensation unit 78 which calculates a motion vector and predicted data by motion compensation from data from the frame memory 79 and an input image.

The code separation unit 71 receives code data on a GOP basis, and separates code data into a header, a code associated with DCT coefficients, a motion vector code, and the like. The entropy decoding unit 72 entropy-decodes the separated code and outputs the resultant data to the dequantization unit 73. The dequantization unit 73 dequantizes the information associated with the DC coefficients and outputs the resultant information to the inverse DWT unit 74. The inverse DWT unit 74 performs inverse DWT and outputs the resultant data to the addition unit 75.

The mode determination unit 77 detects whether the decoded image is an I-picture or another type of picture, on the basis of the header of a picture layer in input code data in the information obtained by the code separation unit 71, and sends the information indicating the determination result to the addition unit 75, motion compensation unit 78, and switching device 80. If the mode determination result from the switching device 80 indicates an I-picture, an output from the addition unit 75 is written on the frame memory 79. That is, the contents of the frame memory 79 are updated only when an I-picture is decoded.

The motion compensation unit 78 performs motion compensation by using the information of a motion vector output from the entropy decoding unit 72 and information from the frame memory 79, and sends the compensated image to the addition unit 75. The addition unit 75 sends a result from the inverse DWT unit 74 to the block combining unit 76 without any change when the mode determination result indicates an I-picture. When the mode determination result indicates a picture other than an I-picture, the pixels of an image output from the motion compensation unit 78 are added to the corresponding pixels of an image (difference image) from the inverse DWT unit 74, and the resultant data is sent to a block combining unit 76.

A simple flow of the above moving image decoding processing will be described with reference to the flowchart of FIG. 13. FIG. 13 is a flowchart showing a decoding sequence in the moving image decoding apparatus according to the fourth embodiment. In brief, the processing in steps S500 to S511 is performed for each small region obtained by segmenting an image into small regions, and the small regions are combined to generate a video frame in step S512.

First of all, when decoding is started (step S500), the presence/absence of an input code is detected (step S501). When decoding of all the frames is complete, the decoding is terminated (step S502). If decoding of all the frames is not complete, a code is separated into a header an image signal code, a motion vector code, and the like (step S503).

Subsequently, entropy decoding processing is performed (step S504). The picture type of an image to be decoded is detected from header information (step S505). In the case of an I-picture, the entropy decoding result is dequantized and is subjected to inverse DWT (steps S509 and S510). Thereafter, the decoded image is stored in the frame memory (step S511). The result is output as a video frame (step S512).

If it is determined in step S505 that the picture is not an I-picture, the data is dequantized and is subjected to inverse DWT (steps S506 and S507). Motion compensation is performed by using the decoded image stored in step S511 (step S508). The compensated image and the inverse DWT (step S507) result are added, and the resultant data is output as a video frame (step S512).

As described above, according to the fourth embodiment, even if bitplane coding is performed, and moving image code data subjected to code amount control based on bitplane rounding down operation is input, since there is no need to perform decoding processing in which error accumulation occurs as in a case wherein P-pictures are generated from P-pictures, a good moving image can be played back.

In the fourth embodiment as well, only I- and P-pictures have been described. However, the present invention is not limited to this. Even if B-pictures which are bidirectionally predicted pictures are introduced, the embodiment can be implemented by increasing the capacity of the frame memory and referring to I-pictures in the same manner.

Each process in FIG. 12 in this embodiment may be implemented by software executed by a personal computer or the like. In this case, input of moving image data can be handled by equipping the apparatus with a video capture card or the like. In general, a computer program can be executed by setting a computer-readable storage medium such as a CD-ROM storing the program and copying or installing the program in the system, and hence such a computer-readable storage medium is included in the category of the present invention.

The coding scheme is not limited to the JPEG 2000 coding scheme, and an extended layer coding scheme in FGS coding in the MPEG-4 coding scheme may be used.

The first to fourth embodiments have described above. As is obvious, however, a function corresponding to each processing unit can be implemented by a computer program, and hence the present invention incorporates such a computer program itself within its category. In general, a computer program can be executed by setting a computer-readable storage medium such as a CD-ROM storing the program and copying or installing the program in the system, and hence such a computer-readable storage medium is included in the category of the present invention.

As has been described above, according to the present invention, even in a case wherein final code data is to be generated by selectively discarding code data for bitplane, it is possible to suppress errors due to bitplane rounding down operation from being gradually accumulated in a predicted frame image such as a P- or B-picture, thereby preventing a deterioration in image quality.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-071399 filed on Mar. 12, 2004 and Japanese Patent Application No. 2005-015847 filed on Jan. 24, 2005, the entire contents of which are hereby incorporated by reference herein.

The invention claimed is:

1. A moving image coding apparatus that sequentially inputs and codes image data of frames constituting a moving image, the apparatus comprising:
a mode selection unit that adaptively selects, for each frame, either a first coding mode or a second coding mode, where the first coding mode is for coding a frame by referring to another frame using an inter-frame coding method and the second coding mode is for coding a frame without referring to another frame using an intra-frame coding method;
a storage unit that stores a frame image as a reference frame to be referred in the first coding mode;
a segmentation unit that segments image data of a current input frame into a plurality of blocks;
a computation unit that (i) extracts, from the reference frame stored in said storage unit, predicted data for a segmented block image of the current input frame obtained by said segmentation unit and outputs a block obtained by subtracting the predicted data from the segmented block image, if the mode for the current input frame selected by said mode selection unit is the first coding mode, or (ii) outputs the segmented block image of the current input frame obtained by said segmentation unit, if the mode of the current input frame selected by said mode selection unit is the second coding mode;
a transformation unit that executes discrete wavelet transformation for the block obtained by said computation unit to obtain spatial frequency component data;
a code data generating unit that encodes the spatial frequency component data for each bitplane to generate code data for each bitplane;
an adjusting unit that adjusts a code data amount by discarding code data corresponding to bitplanes from a least significant bit position to a predetermined bit position;
an output unit that outputs remaining code data from said adjusting unit as the code data of the segmented block; and
a decoding unit that, only when said mode selection unit selects the second coding mode for the input current frame, performs bit-shifting of the code data of the current input frame by a number of discarded bitplanes by said adjusting unit, decodes the bit-shifted code data of the current input frame, and stores the decoded image of the current input frame as the reference frame into said storage unit.

2. The apparatus according to claim 1, further comprising an instruction unit that instructs whether to discard code data of bitplanes by said adjusting unit.

3. The apparatus according to claim 1, wherein said mode selection unit selects the second coding mode for a frame which is input for the first time after a number of input frames becomes a predetermined number.

4. A control method for a moving image coding apparatus that includes a computer processor and a storage unit storing a frame image and sequentially inputs and codes image data of frames constituting a moving image, the method comprising:
a mode selection step of adaptively selecting, for each frame, either a first coding mode or a second coding mode, where the first coding mode is for coding a frame by referring to another frame using an inter-frame coding method and the second coding mode is for coding a frame without referring to another frame using an intra-frame coding method;

storing in the storage unit a frame image as a reference frame to be referred to in the first coding mode;

a segmentation step of segmenting image data of a current input frame into a plurality of blocks;

a computation step of (i) extracting, from the reference frame stored in the storage unit in said storing step, predicted data for a segmented block image of the current input frame obtained in the segmentation step and outputting a block obtained by subtracting the predicted data from the segmented block image, if the mode for the current input frame selected in said mode selection step is the first coding mode, or (ii) outputting the segmented block image of the current input frame obtained in the segmentation step, if the mode of the current input frame selected in said mode selection step is the second coding mode;

a transformation step of executing discrete wavelet transformation for the block obtained in the computation step to obtain spatial frequency component data;

a code data generating step of encoding the spatial frequency component data for each bitplane to generate code data for each bitplane;

an adjusting step of adjusting a code data amount by discarding code data corresponding to bitplanes from a least significant bit position to a predetermined bit;

an output step of outputting remaining code data from the adjusting step as the code data of the segmented block, wherein the output step is performed, at least in part, by the computer processor; and a decoding step that, only when said mode selection step selects the second coding mode for the input current frame, performs bit-shifting of the code data of the current input frame by a number of discarded bitplanes by said adjusting step, decodes the bit-shifted code data of the current input frame, and stores the decoded image of the current input frame as the reference frame into the storage unit.

5. A non-transitory computer-readable storage medium storing a computer-executable program that, when executed by a computer, causes the computer to perform a method of controlling moving image coding apparatus that includes a storage unit storing a frame image and sequentially inputs and codes frames constituting a moving image, the method comprising:

a mode selection step of adaptively selecting, for each frame, either a first coding mode or a second coding mode, where the first coding mode is for coding a frame by referring to another frame using an inter-frame coding method and the second coding mode is for coding a frame without referring to another frame using an intra-frame coding method;

a storing step of storing in the storage unit a frame image as a reference frame to be referred to in the first coding mode;

a segmentation step of segmenting image data of a current input frame into a plurality of blocks;

a computation step of (i) extracting, from the reference frame stored in the storage unit, predicted data for a segmented block image of the current input frame obtained in the segmentation step and outputting a block obtained by subtracting the predicted data from the segmented block image, if the mode for the current input frame selected in said mode selection step is the first coding mode, or (ii) outputting the segmented block image of the current input frame obtained in the segmentation step, if the mode of the current input frame selected in said mode selection step is the second coding mode;

a transformation step of executing discrete wavelet transformation for the block obtained in the computation step to obtain spatial frequency component data;

a code data generating step of encoding the spatial frequency component data for each bitplane to generate code data for each bitplane;

an adjusting step of adjusting a code data amount by discarding code data corresponding to bitplanes from a least significant bit position to a predetermined bit position;

an output step of outputting remaining code data in the adjusting step as the code data of the segmented block;

a decoding step that, only when said mode selection step selects the second coding mode for the input current frame, performs bit-shifting of the code data of the current input frame by a number of discarded bitplanes by said adjusting step, decodes the bit-shifted code data of the current input frame, and stores the decoded image of the current input frame as the reference frame into the storage unit.

* * * * *